United States Patent Office 2,778,859
Patented Jan. 22, 1957

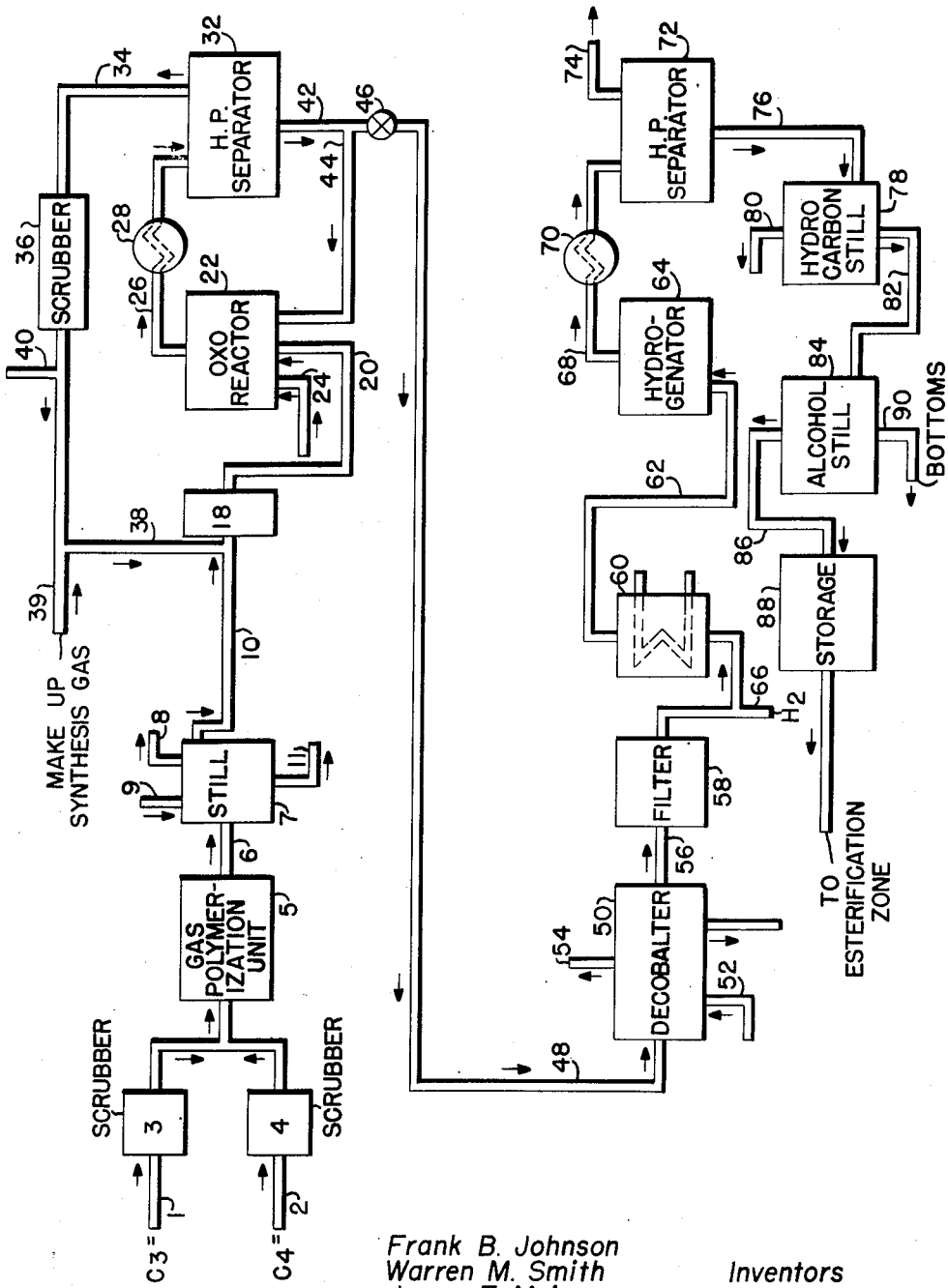

2,778,859

SULFUR-FREE OXO ALCOHOLS

Frank B. Johnson, Warren M. Smith, and James E. Moise, Baton Rouge, La., assignors to Esso Research and Engineering Company, a corporation of Delaware Application May 27, 1953, Serial No. 357,782

4 Claims. (Cl. 260—638)

The present invention relates to the preparation of oxygenated organic compounds from olefins by reacting the latter with CO and $H_2$ in the presence of carbonylation catalysts. More specifically, the present invention relates to the preparation of alcohols of a high degree of purity suitable for employment in processes requiring quality grade alcohols, such as in the manufacture of plasticizers for clear and colorless plastics.

The synthesis of alcohols from olefins by treating the latter with CO and $H_2$ in the presence of a group VIII catalyst, particularly cobalt, is well known in the art. In the first stage the olefinic material, catalyst, and $H_2$ and CO are reacted at superatmospheric pressures and elevated temperatures to give a product consisting essentially of aldehydes containing one more carbon atom than the olefin. This mixture, which contains dissolved in it salts and carbonyls of the catalyst, is treated in a second stage to cause removal of the metal compounds from the aldehyde product. Thereafter, the catalyst-free product is generally hydrogenated to the corresponding alcohol.

This carbonylation reaction provides a particularly attractive method for preparing valuable primary alcohols which find large markets particularly as intermediates for plasticizers, detergents and solvents. Amenable to the reaction are long and short chained organic compounds having olefinic unsaturation in the molecule, such as straight and branch chained olefins, olefinic oxygenated compounds, olefinic polymers and the like.

The catalyst in the first stage may be added as the olefin-soluble salt of cobalt, such as cobalt oleate or naphthenate. Also, aqueous solutions of cobalt compounds, or slurries of oil-insoluble forms of cobalt may be employed. Inasmuch as the active catalyst is probably cobalt hydrocarbonyl, most forms of the metal may be employed as catalyst, for they are converted into the active catalyst species in the course of the reaction.

The synthesis gas mixture fed to the first stage may consist of an $H_2/CO$ ratio of 4 to 1 to 1 to 4. Preferably, however, these gases are present in about equimolar ratio. The conditions for reacting $H_2$ and CO vary somewhat in accordance with the nature of the olefin feed and form of catalyst; generally, the reaction is conducted at about 2000–4500 p. s. i. g., preferably at 2500–3500 p. s. i. g., and at a temperature in the range of about 250°–450° F., preferably 300°–375° F.

Following the carbonylation stage the aldehyde product, containing in solution considerable amounts of dissolved catalyst, is generally treated at elevated temperatures in the presence of a gas or vapor, such as $H_2$ or steam, to decompose the carbonyl to an oil-insoluble form of cobalt and drive off the CO formed. Thereafter, the aldehyde product is freed of suspended catalyst and is passed to a hydrogenation zone for conversion to the alcohol.

The hydrogenation stage may be operated at conventional conditions including temperatures and pressures of the same order of magnitude as those obtaining in the first, or carbonylation, stage. Various known types of catalysts, such as nickel, molybdenum, tungsten, and their oxides or sulfides, supported or unsupported, may be employed.

The liquid product from the primary hydrogenation stage is worked up by distillation to separate the desired alcohols from side reaction products, such as hydrocarbons and unreacted materials, as well as condensation products.

One of the largest and most important uses developed for the synthetic alcohol product is that of producing esters suitable for plasticizers, by reaction with aliphatic, alicyclic, and aromatic acids and anhydrides, such as phthalic, adipic, maleic, and the like. In particular the $C_7$–$C_{10}$ alcohols prepared by oxonation and hydrogenation of the corresponding $C_6$–$C_9$ olefin are especially suitable for the manufacture of ester plasticizers and particularly for use in clear plastics.

These esters are generally prepared in standard type esterification equipment employing reactors made of stainless steel or other corrosion-resistant metal or alloy. It has been found in many instances that the ester product thus produced was deficient as to the standards required for plasticizers, particularly as to such properties as color, odor, and weathering qualities of the plasticized resins. In particular, it was found that the color of the ester product formed by continuously recycling alcohol progressively increased and rapidly darkened, making a large proportion of the ester products completely unsuitable for plasticizing purposes where a colorless or clear plastic is required. Thus in typical commercial alcohol recycle esterification operations, wherein an alcohol is esterified with phthalic anhydride, a 1–20% molal excess of alcohol, based on anhydride, is employed. Unreacted alcohol is stripped from ester product under reduced pressure and blended with fresh alcohol for return to the esterification zone, and it is this alcohol which presents the color problem.

One of the most important class of alcohols suitable for preparation of plasticizers is the octyl alcohols. These have hitherto been supplied on a commercial scale mainly by such comparatively costly procedures as aldol condensation of butyraldehydes, followed by dehydration and hydrogenation of the unsaturated octyl aldehyde. However, with the introduction of the carbonylation, or aldehyde synthesis reaction, it was found that these octyl alcohols could readily be prepared from various olefinic $C_7$ fractions commercially available. Olefin fractions readily available are principally those derived and resulting from the processing of petroleum distillates and residua. Thus, available on a large scale are olefin fractions from thermal and catalytic cracking processes, either directly or from polymerization of olefins derived from these processes. These sources all produce, in large supply, olefin fractions containing substantial amounts of heptenes.

One of the most promising sources of supply of heptenes is the olefin polymerization process wherein low molecular weight olefins, such as propylene and butylenes, are polymerized in the presence of a catalyst, such as phosphoric acid on a siliceous carrier, to produce a large variety of olefinic products. Many refinery light end streams contain appreciable amounts of olefins, and most suitable are the $C_3$ and $C_4$ fractions for this polymerizing process.

Desirable as it is to utilize these olefins from petroleum sources in the preparation of plasticizing alcohols and esters, it has been found that the alcohols thus prepared by reacting the heptene fraction from a commercial olefin polymerization process with CO and $H_2$ are particularly susceptible to the defect hitherto pointed out, in that the alcohols thus formed tend rapidly to build up color bodies in the course of esterification.

It has now been found that the color forming tendencies of the alcohol product are intimately associated with extremely minute amounts of sulfur compounds present in the olefin feed, and particularly in the feed to the polymerization zone wherein the $C_3$ and $C_4$ streams are copolymerized. The feed streams frequently have sulfur contents of 0.1% and higher and, in the prior art, where these polymerized hydrocarbons were to be used as gasoline with or without a subsequent hydrogenation treatment, it was sufficient to reduce the sulfur level to, say 0.03 to 0.08%. However, it has been now determined that sulfur in amounts as low as 20 parts per million, or .002%, in the finished alcohol product, is sufficient to make the latter completely unsuitable for esterification purposes.

In general, the entire content of the sulfur which is present in the synthetic Oxo alcohols is in the form of organically combined sulfur. Although the exact type of organic impurity in which the sulfur occurs has not been determined fully, in general, it is deleterious in all forms. However, the form of sulfur changes in the course of the process from the introduction of the feed to the polymerization zone to the final alcohol distillation process.

It is a difficult and expensive process to remove undesirable products present in the carbonylation alcohol, either directly from the latter or from the feed streams to the carbonylation process. Thus, caustic washing of the crude alcohol product to remove acidic constituents leaves untouched such non-acidic sulfur compounds as disulfides. To employ a substantially sulfur-free feed stock, though desirable, severely limits the availability of suitable feed stock for the process.

In brief, therefore, extremely small amounts of sulfur appearing in the alcohol product, to the extent of more than about 10–15 parts per million, when this is to be used for plasticizing purposes, plays an important role in degrading the resulting ester and making it unfit for use, and this sulfur is introduced principally with the olefin feed.

Thus, in a commercial plant operation, manufacturing octyl alcohol from a $C_7$ olefin fraction which was in turn prepared from copolymerizing propylene and butylenes, it was found that a 14,000 gallon portion of alcohol produced contained only 12 parts per million of sulfur. Yet on esterification, an ester color of 0.35 was produced. Even with this extremely small amount of sulfur, the alcohol was thus unsuitable for use as a plasticizer intermediate for later esterification. The ester color is a measure of the optical density of the phthalate ester as produced under prescribed conditions, and is expressed in terms of color absorbency of the ester at a standard wave length of light, a high value indicating a darkened, low quality ester product; for isooctyl phthalate, a wave length of 4470 A. is used, and to be satisfactory, the ester color may not be higher than 0.15.

In accordance with the present invention, high quality alcohols suitable for plasticizing purposes are obtained by employing as a feed to the aldehyde synthesis reaction zone, one substantially completely free of sulfur, i. e. one that contains less than 25 parts per million sulfur. In a preferred embodiment of the present invention, such a feed is prepared by removing thoroughly organic sulfur present in refinery streams passed to a light ends polymerization zone. Thus, refinery streams containing $C_3$ and $C_4$ olefins may be passed through a caustic scrubbing system to reduce the sulfur content of the respective streams to less than 10 parts per million. It is particularly advantageous to remove sulfur at this stage rather than subsequently in the process, for the sulfur present in the refinery light ends streams is present mostly as mercaptan sulfur. If not removed prior to passage to the polymerization zone, the sulfur tends to become converted in part to disulfides and oxygenated sulfur compounds, which are much more difficult to remove. It has been found that the alcohols produced by oxonating $C_7$ olefins thus produced, i. e. by removing sulfur from the feed to the polymerization zone, formed in turn octyl esters of completely satisfactory color characteristics.

It will be recognized that though olefins boiling in the gasoline range have been hitherto treated to decrease sulfur or render their sulfur content inactive, i. e., by Doctor Sweetening, such decrease or inactivation is not adequate for preparation of feed stocks suitable as intermediates for the production of plasticizing alcohols. The upper limit of sulfur tolerance of a gasoline is 1000 parts per million; if the sulfur is in the form of a disulfide, it need not be removed at all. But for the alcohol synthesis process, the tolerance limit is less than 25 parts per million in the feed, to produce an alcohol product containing less than about 10 parts per million.

The present invention and its application will best be understood from the more detailed description hereinafter, wherein reference will be had to the accompanying drawing, which is a schematic representation of a system suitable for carrying out a preferred embodiment of the invention.

Referring now to the drawing, $C_3$ and $C_4$ olefin streams which have been previously fractionated in suitable equipment in a light ends plant, and which may have resulted from catalytic or thermal cracking of gas oil or other suitable material, are passed through lines 1 and 2 to caustic scrubbers 3 and 4 respectively. The streams are preferably low in isobutylene content, and for this purpose, the butylene stream may first have been extracted with suitable agents to reduce or remove iso-$C_4^-$, such as 60% $H_2SO_4$, cresol, and the like. The light ends streams contain a greater or smaller amount of sulfur depending upon the nature of the cracking stock. Average composition may be up to 0.1%.

In one embodiment, the scrubbers measure 6½'x30' and contain 10 pierced plates. Fresh caustic solution at an ambient temperature containing 7%–10% NaOH is used and this solution is preferably used once-through and discarded to spent caustic tankage at a level of 5% to 10% "spent"; that is, it contains 5%–8% free NaOH. Such a scrubbing system has been found to result in a feed to the subsequent polymerization plant containing as low as 2–5 p. p. m. of sulfur and the resulting $C_7$ olefin produced in said plant has contained 3–10 p. p. m. of sulfur.

The $C_3$ and $C_4$ streams, now containing less than about 10 p. p. m. of sulfur, are passed into polymerization unit 5 wherein the olefins are polymerized in the presence of a calcined phosphoric acid-kieselguhr catalyst. The reaction conditions within polymerization plant 5, which may be operated in one or more stages, include temperatures of about 380–500° F., pressures of 200–1200 p. s. i. g., and feed rates of 0.5–6.0 volumes liquid/vol. reaction space per hour. The ratio of $C_3$ to normal $C_4$ olefin may be 100/1 to 2/1.

The total polymerizate from unit 5 is passed via line 6 to still 7. Light material is taken overhead as a heads cut through line 8. The heart cut, corresponding to the heptene fraction, is withdrawn through line 10. This fraction boils in the range of about 165°–210° F. at atmospheric pressures, and has a heptene content of about 85–100%. As will be developed below in an alternate embodiment of the present invention, volatilities of impurities in still 7 may be controlled by distillation adjuvants introduced through line 9.

The olefin is passed through line 10 and is pumped to preheater 18 wherein it is brought to the desired temperature range and then discharged via line 20 to the bottom of primary carbonylation reactor 22. Suitable catalyst, such as cobalt oleate naphthenate and the like is added through line 24 in such proportions that the weight of cobalt in solution is about 0.1–0.3% of the total liquid. Reactor 22 comprises a high pressure reactor vessel which may, if desired, be packed with non-catalytic material such as ceramic rings, porcelain or quartz chips, pumice and the like. It may also be divided into discrete packed zones separated by any suitable means, such as support grids, etc. or it may comprise but a single packed zone, or it may contain no packing.

A stream of synthesis gas comprising $H_2$ and CO in the approximate ratio of 0.5–2 volumes $H_2/CO$, preferably 1.0–1.2 to 1, is fed into reactor 22 through line 38. The synthesis gas stream is a composite of fresh gas and recycle, and flows upwardly with the olefin feed through reactor 22. The latter is preferably operated at a pressure of about 2500–3500 p. s. i. g. and at a carefully controlled temperature range of 300°–375° F., preferably between 340°–360° F. The rate of flow of synthesis gases and of olefin through reactor 22 is so regulated that the desired conversion level of olefin is obtained. These conditions include an olefin fresh feed rate of about 0.3–1.0 v./v./hr., fresh synthesis gas feed rates of 1000–10,000 cubic feet/barrel of olefin, catalyst concentration of 0.1–0.3% cobalt based on olefin feed, and a nominal residence time of about 1–3 hours.

The carbonylation reaction may be carried out substantially adiabatically, that is, no external cooling means such as tubes or coils need be provided, but cooling and temperature control of the highly exothermic reaction is carried out by recycle of a portion of the product, as described below. Liquid oxygenated reaction products containing catalyst in solution, as well as unreacted synthesis gases are withdrawn from an upper portion of high pressure reactor 22 and transferred through line 26 and cooler 28 to high pressure separator 32 where unreacted gases are withdrawn overhead through line 34, scrubbed in scrubber 36 of entrained liquid, and preferably recycled to reactor 22 via line 38. Make up synthesis gas may be admitted through line 39. A portion of the recycle may be purged through line 40 to maintain the desired $H_2/CO$ ratio in the feed.

Liquid carbonylation product containing dissolved therein relatively high concentrations of cobalt carbonyl is withdrawn from separator 32 via line 42. A portion of this stream may be recycled to reactor 22 via line 44 to aid in the cooling and maintenance of temperature control of the primary carbonylation stage. Preferably recycle liquid product is injected at various levels within reactor 22 to obtain close temperature control throughout the whole reactor. Approximately 400–500 volume percent of liquid reaction product on the fresh olefin feed may be recycled for this purpose. The temperature of such recycled material is generally dependent on that of the atmosphere, and may be about 30°–100° F.

The balance of the primary reaction product not recycled to reactor 22, which may comprise, beside desired octyl aldehydes, also unreacted olefins, secondary reaction products, and dissolved cobalt carbonyls, is withdrawn through pressure release valve 46 and line 48 and passed to decobalting zone 50. Within decobalter 50, soluble cobalt carbonyl is removed from the aldehyde product prior to high pressure hydrogenation in order to prevent its decomposition in the subsequent hydrogenation stage with consequent fouling of coils and reactor plugging. The decomposition of the cobalt carbonyl is obtained by heating the aldehyde product by such means as steam coils, etc. to about 300–350° F. at a pressure just high enough to keep the components in the liquid phase. Pressures in the neighborhood of 100–150 p. s. i. g. are preferred. The product containing catalyst in solution is injected into decobalter 50 through line 48 and stripping gas, such as $H_2$ may be added through line 52 to aid in decreasing the CO partial pressure. If desired, it may be advantageous to operate with two or more decobalters, switching the stream from one to the other as the one in service accumulates excessive quantities of cobalt metal. The gas stream comprising stripping gas and CO may be removed overhead from 50 through line 54 and used as desired. Other means of decobalting, such as by steam, water, or acid, may also be employed.

The liquid aldehyde product now substantially free of dissolved catalyst is withdrawn from 50 through line 56 and passed through filter 58 for removal of any suspended cobalt. The filtered solution is withdrawn from 58 and passed through preheater 60 to the bottom portion of hydrogenation reactor 64 via line 62. Simultaneously, hydrogen is supplied to 64 in proportions more than sufficient to convert the aldehydic product into octyl alcohols. Hydrogenator 64 may contain a mass of any conventional hydrogenation catalyst, such as nickel, copper chromite, sulfactive catalyst such as tungsten, nickel or molybdenum sulfide, preferably supported on carriers such as pumice, charcoal, etc. Reactor 64 is preferably operated at temperatures of about 300°–500° F. and pressures of about 2500–3500 p. s. i. g.

The products from the hydrogenation reactor and unreacted hydrogen may be withdrawn overhead through line 68, passed through cooler 70 and high pressure separator 72, whence excess $H_2$ is removed overhead through 74 for recycle. The liquid product is withdrawn from separator 72 through line 76 and, after passing through conventional low pressure separators and stabilizers (not shown), is passed to hydrocarbon still 78, wherein are distilled overhead low boiling products, mostly hydrocarbons boiling below 356° F. These materials are removed through 80 as a heads cut and may be used as gasoline blending agents. The bottoms from this primary distillation are withdrawn from hydrocarbon still 78 via line 82 and sent to alcohol still 84 where an octyl alcohol cut boiling within the range of 356° to 392° F. at atmospheric pressures is taken. However, if desired, it may be desirable to distill alcohols at reduced pressure. The alcohols are withdrawn overhead from still 84 through line 86 and sent to storage tank 88, from whence they are sent to an esterification plant for conversion into a di-octyl ester, such as di-octyl phthalate, all in a manner known per se. High boiling bottoms from 84 may be withdrawn through line 90 and may be used in any desired manner, such as cracking stock, fuel, etc., or they may be further processed and distilled at subatmospheric pressures to recover valuable oxygenated organic products.

In accordance with the present invention, substantially sulfur-free alcohols, or an alcohol product containing less than about 10 parts per million, may be produced.

To show that high ester color is directly associated with sulfur content, the following data are presented. In the first series of experiments, synthetic mixtures of mercaptans and octyl alcohols were prepared, while in the second series, plant alcohol samples were analyzed for sulfur content and ester color.

| | P. P. M. Sulfur | Ester Color @ 4,470 A. |
|---|---|---|
| N-heptyl mercaptan in 2-ethyl hexanol: | | |
| A | | 0.03 |
| B | 2 | 0.09 |
| C | 5 | 0.16 |
| D | 10 | 0.38 |
| Iso-octyl mercaptan in iso-octyl (Oxo) alcohol: | | |
| E | | 0.03 |
| F | 3 | 0.15 |
| G | 10 | 0.50 |

In another operation, plant correlated data showed the following relationship between sulfur in the feed and in the alcohol and the corresponding ester color.

| Sulfur in $C_7$ Feed, P. P. M. | Ester Color | Sulfur in Alcohol, P. P. M. |
|---|---|---|
| 10 | 0.10 | 2 |
| 20 | 0.14 | 4 |
| 30 | 0.20 | 10–15 |
| 40 | 0.28 | 15–25 |
| 50 | 0.38 | 20–30 |

This correlation between sulfur in the feed and in the alcohol, and ester color is to a certain extent variable, depending upon the type of sulfur present in the respective feed and alcohol, but the above data have been found to be average for plant results.

The difficulty of removing sulfur once it has gotten into the C₇ polymer is clearly shown in the following tabulation, which depicts methods which have been tried to remove sulfur from the C₇ polymer olefin.

*Desulfurization of C₇ UOP olefins*

| Test | Conditions | Results |
|---|---|---|
| 1 | Copper on Alumina 300° F., 100 p. s. i. g. | Feed=11-13 p. p. m. S., Product 7→11 p. p. m. S. |
| 2 | Copper on Alumina 300° F., 100 p. s. i. g. @ 300→ 700° F. (Hydrogen Added). | Feed 99 p. p. m. S., Product 100→15 p. p. m. S., 10% Loss of Lt. Ends and Polymer. |
| 3 | UOP Nickel, 200-250° F. | Feed 98 p. p. m. S., Product 39-16 p. p. m. Loss in activity to 68 p. p. m. S. at end of run plus 7-14% of olefin hydrogenated. |
| 4(a) | Iron Rust | Feed 61 p. p. m. Product 46 p. p. m. |
| 4(b) | Iron Rust, Room Temperature. | Feed=35 p. p. m., Product 35 p. p. m. |
| 5 | Resin IRA-400, 1 v./v./hr. @ Room Temp. | Feed=35 p. p. m., Product=34 p. p. m. |
| 6 | Charcoal, 1 v./v./hr. @ Room Temp. | Feed=30 p. p. m., Product=33 p. p. m. |
| 7 | 5% NaOH or 10% NaOH | Feed=30 p. p. m., Product=36 p. p. m. |
| 8 | Mercurous Nitrate, 1% as Solid (Analytical Method) (for Thioether). | Feed=30 p. p. m., Product=<1 p. p. m. |

From these data it can be readily seen that the only effective method has been treatment with mercurous nitrate, the use of which would be prohibitive on a commercial operation. It is also seen that caustic treating of the olefin feed to the Oxo stage with 5% or even 10% sodium hydroxide gave no improvement whereas similar treatment of the feed to the polymerization unit gave substantial decrease in the sulfur content of from 25 p. p. m. to as low as 2-5 p. p. m.

In another embodiment of the present invention, small amounts of certain distillation adjuvants are added to the polymer distillation zone through line 9. Thus, any mercaptans not removed in scrubbers 3 and 4 react in unit 5 to form higher mercaptans or thioethers. In the distillation zone 7, those sulfur compounds having the same boiling range as the C₇ olefins, or which azeotrope with them, would be withdrawn with the Oxo feed stream. In accordance with one embodiment of the invention, a small amount of strong H₂SO₄ of 70-98% strength, is continuously admitted through line 9, to the extent of less than 5%, and preferably 0.1-1.0 wt. percent of feed. The passage of the acid downwardly through the tower serves to depress the volatility of sulfur compounds contained in the feed to the tower. The acid provides formation of loose molecular complexes with mercaptans and thioethers, and thus any such present in the tower are withdrawn through line 11, together with H₂SO₄ and higher boiling olefins. Any mono and dialkyl sulfates formed in tower 7 are also effective in reducing the relative volatility of thioethers and mercaptans present.

Instead of H₂SO₄, the relative volatility of any mercaptans and thioethers present in still 7 may also be repressed by adding, in amounts less than 5% on feed, and preferably 0.1 to 1.0%, certain alkaline reacting materials. Thus, metal hydroxides, as those of Na, K, Ba, etc., may be employed which may be solubilized by addition of high boiling alcohols or phenols, etc. Also, organic amines or alkanol amines boiling above the olefin cut to be taken overhead, such as triethanolamines, aliphatic amines, and the like may be employed as volatility repressing agents for organic sulfur compounds. Metal alcoholates and phenolates are also suitable.

The process of the present invention may be subject to many modifications without departing from its spirit. In its broadest aspect, it incorporates the discovery that even extremely small traces of sulfur are deleterious for preparation of high quality Oxo alcohols. Thus, besides the C₃, C₄, and C₇ fraction, other olefin fractions may be treated to reduce their sulfur content below about 25 p. p. m. prior to being employed in the alcohol synthesis process. Besides caustic treating of the light ends streams to the polymer plant, other means of removing sulfur compounds, such as treatment with diethanolamine, lime, solubilized caustic solutions, such as the "Sodasol" or the "Unisol" processes may be employed. Also, other olefins such as those resulting from wax or petrolatum cracking and from hydrocarbon synthesis, may also be made suitable for the production of plasticizing alcohols and esters by the process of the invention.

What is claimed is:

1. An improved process for producing alcohols which comprises passing at least a single hydrocarbon stream rich in low molecular weight normally gaseous olefinic compounds and contaminated with minor amounts of sulfur compounds to a sulfur removal zone, scrubbing said hydrocarbon stream with an alkaline treating agent in the sulfur removal zone, withdrawing from said sulfur removal zone prior to polymerization an olefinic stream substantially reduced in sulfur content and containing no more than about 10 parts per million of sulfur compounds, passing said stream to a polymerization zone, contacting said stream with a light olefin polymerization catalyst to produce a liquid polymeric olefinic mixture, separating a C₇ olefin containing fraction of said olefinic mixture, passing said fraction to a carbonylation zone, treating said separated fraction in said zone with CO and H₂ in the presence of a cobalt catalyst at elevated temperatures and pressures whereby an aldehyde product is formed, reducing said aldehyde product in a hydrogenation zone and recovering an alcohol product of superior properties.

2. The process of claim 1 wherein said stream passed to said sulfur removal zone contains at least 10 parts per million of ethyl mercaptan and said stream withdrawn from said zone less than 10 p. p. m. of ethyl mercaptan.

3. A process according to claim 1 wherein the polymerized olefins are distilled in the presence of sulfuric acid of 70 to 98% strength as a distillation adjuvant.

4. The process of claim 1 wherein said sulfur removal zone contains an aqueous dilute solution of caustic, said caustic being present at a concentration level of not substantially greater than about 10%.

References Cited in the file of this patent

UNITED STATES PATENTS

| 2,558,137 | Hepp | June 26, 1951 |
| 2,595,763 | Carlson et al. | May 6, 1952 |
| 2,625,527 | Smith et al. | Jan. 13, 1953 |
| 2,658,932 | Cohen et al. | Nov. 10, 1953 |
| 2,700,687 | Catterall | Jan. 25, 1955 |

OTHER REFERENCES

I. G. Farben patent application I 72, 975 IVD/120, O. Z. 13604, published in T. O. M. Reel 36 item 21 and part of item 36, pgs. 50 and 51, March 12, 1946 available in translation PC-S-V by Charles Meyer and Co.